(12) United States Patent
Kosaka et al.

(10) Patent No.: US 11,052,950 B2
(45) Date of Patent: Jul. 6, 2021

(54) VEHICLE PILLAR MEMBER

(71) Applicant: TOYODA IRON WORKS CO., LTD., Toyota (JP)

(72) Inventors: Hiroyasu Kosaka, Toyota (JP); Yoshiyuki Nagayama, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 126 days.

(21) Appl. No.: 16/477,255

(22) PCT Filed: Jan. 26, 2018

(86) PCT No.: PCT/JP2018/002408
§ 371 (c)(1),
(2) Date: Jul. 11, 2019

(87) PCT Pub. No.: WO2018/143070
PCT Pub. Date: Aug. 9, 2018

(65) Prior Publication Data
US 2019/0359261 A1    Nov. 28, 2019

(30) Foreign Application Priority Data

Feb. 1, 2017   (JP) .............................. JP2017-016595

(51) Int. Cl.
*B62D 25/07*  (2006.01)
*B62D 25/04*  (2006.01)
*B62D 27/02*  (2006.01)
*B62D 29/00*  (2006.01)

(52) U.S. Cl.
CPC ............. *B62D 25/04* (2013.01); *B62D 27/02* (2013.01); *B62D 29/00* (2013.01)

(58) Field of Classification Search
CPC ......... B62D 25/04; B62D 27/02; B62D 29/00
See application file for complete search history.

(56) References Cited

U.S. PATENT DOCUMENTS

| | | | | |
|---|---|---|---|---|
| 3,159,419 | A * | 12/1964 | Kerby .................... | B62D 25/02 296/193.05 |
| 7,815,247 | B2 * | 10/2010 | Obayashi ............... | B62D 25/04 296/193.06 |
| 9,381,720 | B2 * | 7/2016 | Kwon .................... | B23K 26/32 |
| 9,884,468 | B2 | 2/2018 | Kwon et al. | |

(Continued)

FOREIGN PATENT DOCUMENTS

| | | |
|---|---|---|
| JP | 2009-1121 A | 1/2009 |
| JP | 2009-19229 A | 1/2009 |
| JP | 2015-510453 A | 4/2015 |

OTHER PUBLICATIONS

Apr. 17, 2018 Search Report issued in International Patent Application No. PCT/JP2018/002408.

*Primary Examiner* — Lori L Lyjak
(74) *Attorney, Agent, or Firm* — Oliff PLC

(57) ABSTRACT

Embodiments include a vehicle pillar member, which has a length and includes a plurality of steel sheets welded along at least one joint line transverse to the longitudinal direction, and for each joint line, the strengths of the steel sheets just above and below the joint line are different. The joint lines may include one or more first joint lines inclined with respect to a direction perpendicular to the longitudinal direction of the vehicle pillar member.

8 Claims, 5 Drawing Sheets

(56) References Cited

U.S. PATENT DOCUMENTS

2008/0315628 A1* 12/2008 Obayashi ............... B62D 25/04
                                                         296/193.06
2014/0154521 A1* 6/2014 Kwon ..................... B32B 15/01
                                                            428/577
2017/0247774 A1* 8/2017 Sachdev ............... B62D 25/06

* cited by examiner

VEHICLE PILLAR MEMBER

FIELD OF DISCLOSURE

The present disclosure relates to a vehicle pillar member produced using a tailored blank.

RELATED ARTS

Structural members, such as pillars, of a car frame are produced by pressing or otherwise forming steel sheets into various three-dimensional shapes. For example, Japanese Patent Application Publication No. 2009-1121 discloses a center pillar reinforcement made from a blank that is formed by welding steel sheets with different tensile strengths for the upper, middle and lower portions. Such a blank for pressing that is a combination of different types of steel sheets is generally called a tailored blank.

SUMMARY OF THE DISCLOSURE

The lighter the structural members used in a vehicle, the better the fuel efficiency. Use in part of lighter steel sheets by using tailored blanks as described above is one way to reduce weight. From the viewpoint of collision safety, on the other hand, it is necessary to secure a survival space for occupants in the vehicle interior even if the vehicle body frame is deformed by the collision. In general, when a long member with both ends fixed is subjected to a lateral load, it is likely to deflect the most at the middle of its length if it has a uniform strength, and then bent or broken there. If the pillar is bent in the middle into an angle shape by a side collision, the survival space is more likely to be endangered. It is thus desirable to obtain a vehicle pillar member with improved collision safety as well as reduced weight.

One aspect of the present disclosure is a vehicle pillar member. The vehicle pillar member has a length, and comprises a plurality of steel sheets welded along at least one joint line transverse to the longitudinal direction, and for each joint line, the strengths of the steel sheets just above and below the joint line are different. The joint lines includes one or more first joint lines inclined with respect to a direction perpendicular to the longitudinal direction of the vehicle pillar member. This results in a gradual change in the substantial strength of the vehicle pillar member between the steel sheets just above and below the inclined first joint line. This makes the pillar less likely to break at the first joint line when the pillar is subjected to a lateral force.

In some embodiments, for each joint line, the thicknesses of the steel sheets just above and below the joint line are different. If the steel sheet on one side of the joint line is made thinner than in the conventional pillar, the pillar weight is reduced while the strength of desired areas is maintained.

In some embodiments, the one or more joint lines include a second joint line in at least one of upper and lower ends of the vehicle pillar member, the second joint line being oriented substantially perpendicular to the longitudinal direction, and the strength of the steel sheets outside the second joint line are smaller than the steel sheet just inside the second joint line. This intentionally allows the weaker steel sheet of those just above and below the second joint line to induce, when the pillar is subjected to a lateral force, a breaking mode in which that steel sheet breaks near the joint line to prevent the pillar from breaking in the middle.

In some embodiments, the one or more first joint lines are two first joint lines, and the strengths of two steel sheets immediately outside the uppermost first joint line and the lowermost first joint line are smaller than the strength of the steel sheet or sheets between the two first joint line. This results in a gradual change in strength upward and downward from the steel sheet(s) between the two first joint lines.

In some embodiments, the steel sheet having a highest strength is positioned so as to include the middle of the length of the vehicle pillar member. This prevents the pillar from breaking in half into an angle shape to invade the occupants' survival space.

In some embodiments, for at least one pair of two adjacent first joint lines, the lower end point of the upper first joint line is located above the upper end point of the lower first joint line. As a result, the strength transitioning sections that correspond to the two joint lines do not overlap. If this condition is satisfied particularly for the joint lines on both sides of the strongest steel sheet, the pillar can be less likely to break in that steel sheet.

In some embodiments, at least two first joint lines are parallel. This enables to simultaneously weld two joint lines by passing steel sheets under two fixed welding electrodes or laser sources.

Another aspect of the present disclosure is a blank for use in the production of any of the above-described vehicle pillar members.

DETAILED DESCRIPTION OF EMBODIMENTS

Hereinafter, embodiments of the present invention will be described with reference to the drawings. Blanks in embodiments of the present invention are substantially flat tailored (weld) blanks for press forming a component of a pillar which is disposed on the side of a vehicle such as a car. The pillar may be, for example, a front pillar (A-pillar) located forward of the front door, a center pillar (B-pillar) located between the front and rear doors, or a rear pillar (C-pillar) located rearward of the rear door. Typically, the pillar is configured to form a closed cross section by combining the outer member and the inner member having a length, and the outer member is a hat-shaped cross section having a flange. A reinforcement with a similar hat-shaped cross section may be disposed inside the pillar on the side closer to the outer member. The blanks in the embodiments can be used, for example, to produce the outer member and reinforcement of the pillar by press forming.

Figure 1:
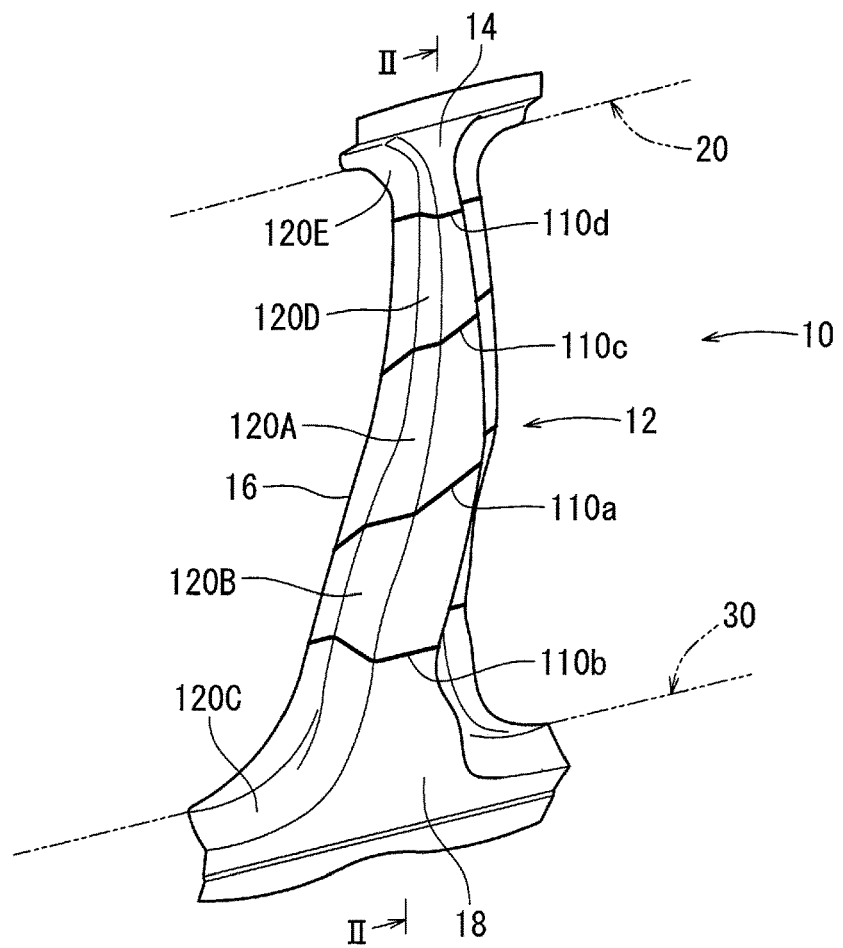
FIG. 1 is a perspective view of an outer member of a center pillar according to an embodiment.

FIG. 1 shows an outer member 12 of a center pillar 10 according to one embodiment. The outer member 12 has upper and lower attachment portions 14 and 18 and a middle beam portion 16, and is joined at the attachment portions 14 and 18 to the roof 20 and the side sill (or rocker panel) 30. Generally, the attachment portions 14 and 18 are formed in a T shape in order to provide a large area for joining with the roof 20 and side sill 30, and have complicated shapes such as a drawing, while the middle beam portion 16 is relatively simple shape.

Figure 3:
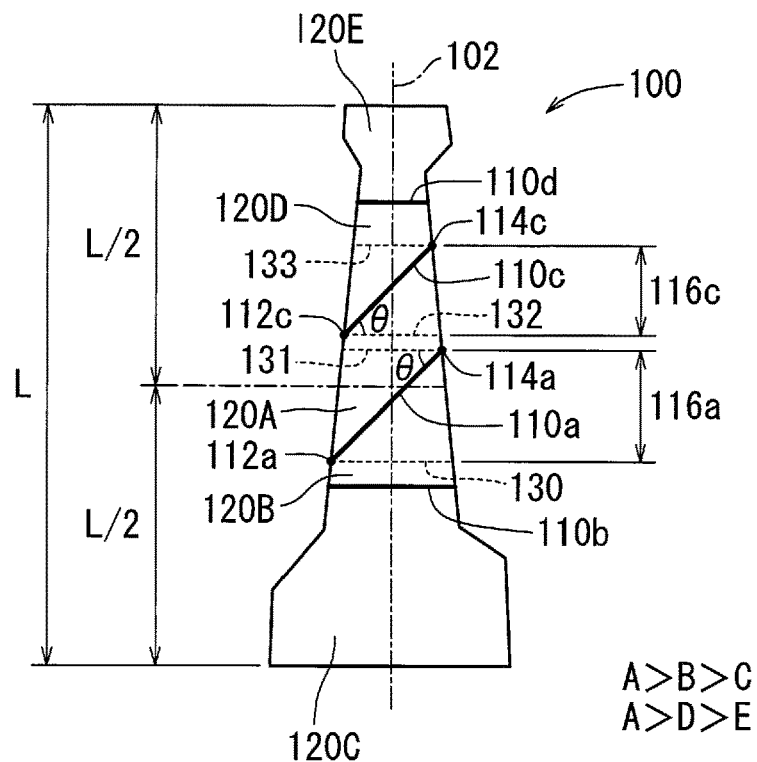
FIG. 3 is a plan view of a blank according to an embodiment, which can be used to produce the outer member of the pillar of FIG. 1.
Figure 4:
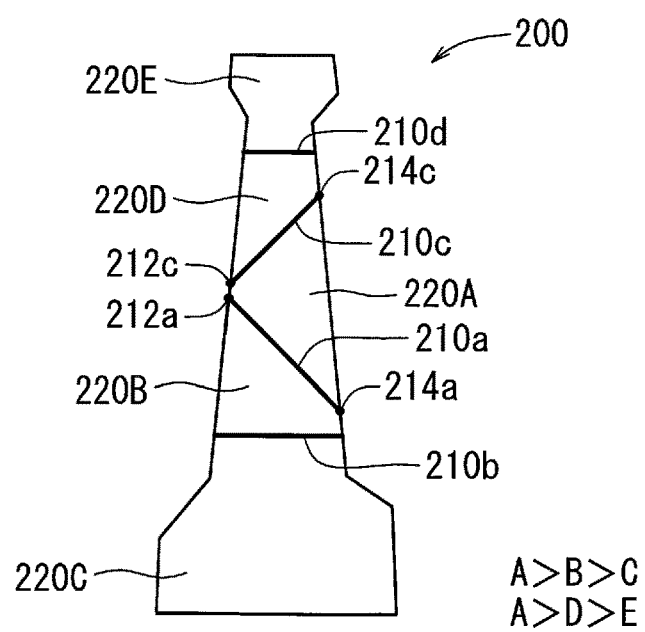
FIG. 4 is a plan view of a blank according to another embodiment.
Figure 5:
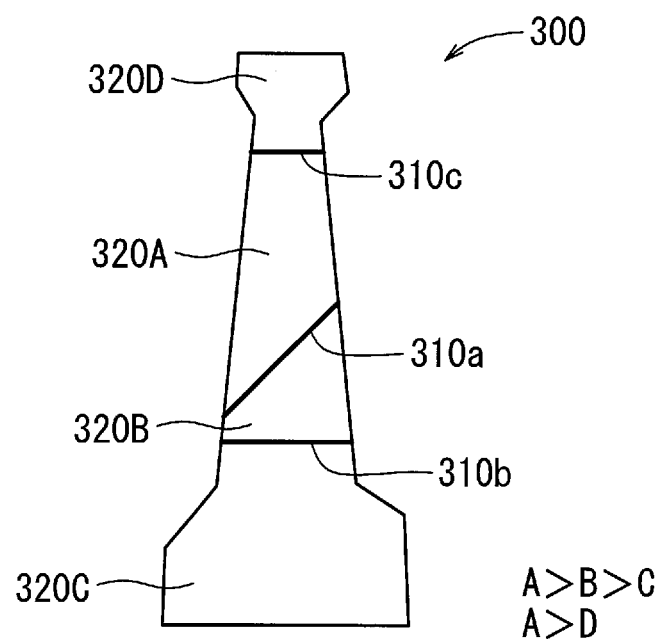
FIG. 5 is a plan view of a blank according to still another embodiment.
Figure 6:
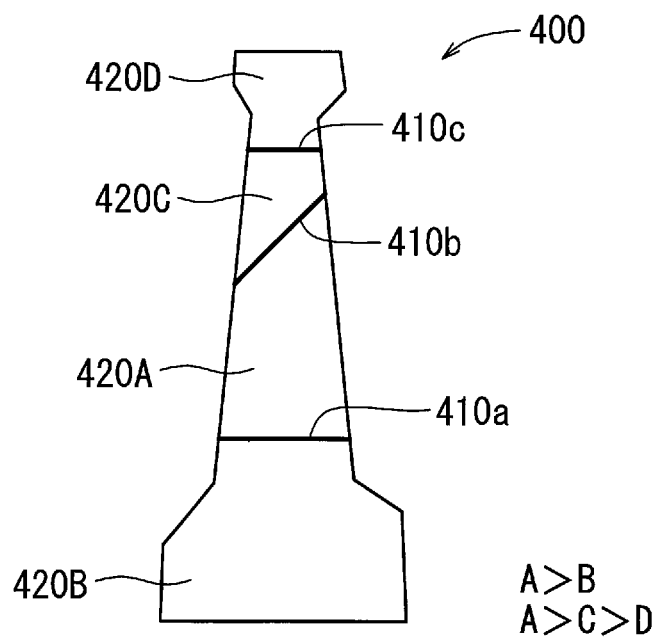
FIG. 6 is a plan view of a blank according to still another embodiment.
Figure 7:
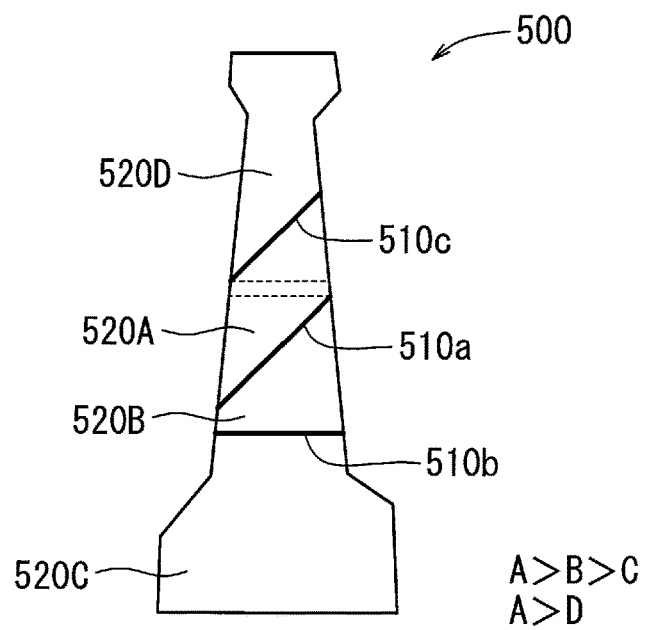
FIG. 7 is a plan view of a blank according to still another embodiment.
Figure 8:
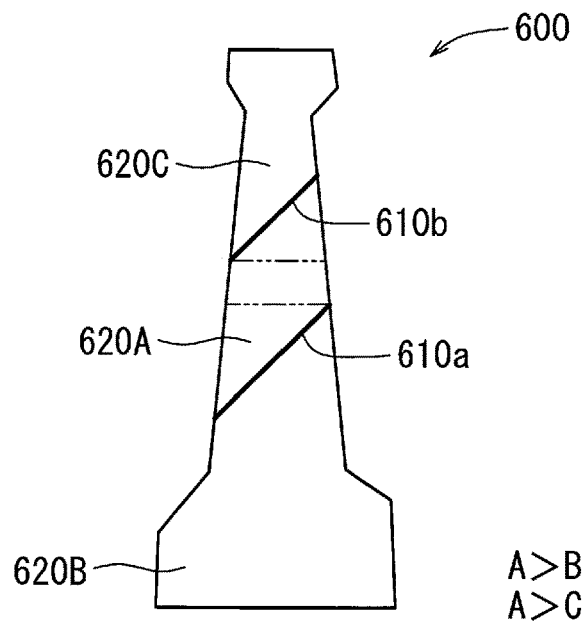
FIG. 8 is a plan view of a blank according to still another embodiment.
Figure 9:
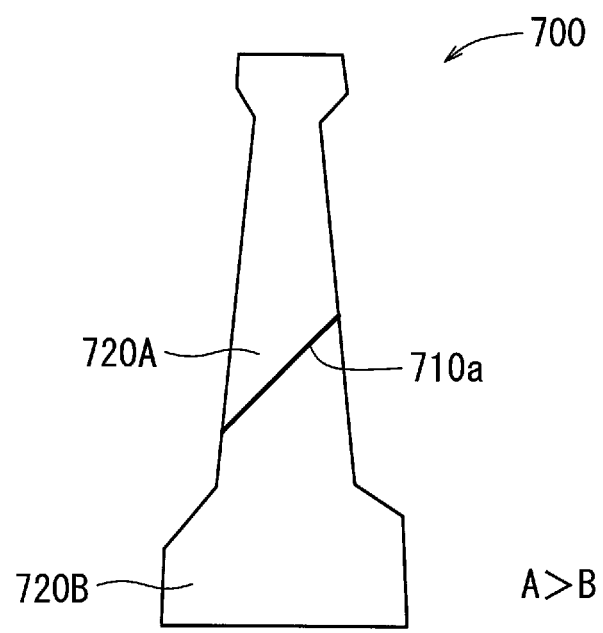
FIG. 9 is a plan view of a blank according to still another embodiment.

As shown in the embodiments of FIGS. 3-9, the blanks 100, 200, 300, 400, 500, 600 and 700 include a plurality of steel sheets 120, 220, 320, 420, 520, 620 and 720 (each with an upper case letter) welded along at least one joint line 110, 210, 310, 410, 510, 610, 710 (each with a lower case letter) transverse to the longitudinal direction 102. FIG. 3 shows a blank 100 which can be used for press forming the outer member of the center pillar of FIG. 1, and FIGS. 4 to 9 show blanks in embodiments different from FIG. 1. In the embodiment of FIGS. 3 and 4, the blank comprises five steel sheets welded along four joint lines 110a-d, 210a-d oriented transverse to the longitudinal direction 102. Similarly, FIGS. 5, 6 and 7 show a four-sheet configuration with three joint lines 310a-c, 410a-c, 510a-c, and FIG. 8 shows a three-sheet configuration with two joint lines 610a-b, and FIG. 9 shows an embodiment of a two-sheet blank with one joint line 710a. The method of welding the steel sheets along each joint line may be laser welding, plasma welding, (mash) seam welding, or any other appropriate methods. The steel sheets may be welded with the ends butted or overlapped. Each joint line may be straight to facilitate welding.

Figure 2:
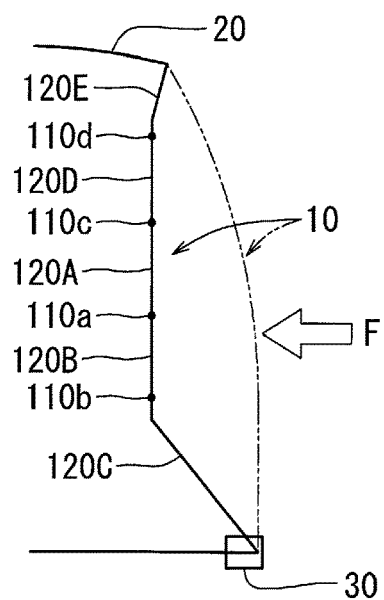
FIG. 2 is a cross-sectional view of the pillar of FIG. 1 at line II-II, schematically showing the deformation of the pillar in the event of a side collision.

For each joint line, the strengths (or yield strengths) of the steel sheets just above and below it (i.e. those adjacent to each other across the joint line) are different. Since the strength of each steel sheet depends on the tensile strength of the material itself (after quenching) as well as the thickness of the steel sheet, those skilled in the art can adjust to the desired strength (or yield strength) of each portion in the pillar component by changing the material and thickness. In one embodiment, the steel sheet with the highest strength can be designed to include the right middle of the length L of the blank. For example, in the blank 100 of FIG. 3, the strength of the central steel sheet 120A has the maximum strength and include the middle (i.e. the location at distance L/2 from the end) of the length L of the blank 100. In this way, it is possible to prevent the pillar from breaking into a large shape when it is subjected to lateral force and to invade the occupants' survival space (FIG. 2). The terminal steel sheets (e.g., 120C, 120E in FIG. 1) including the attachment portions 14 and 18 of the pillar member can be made from the strength smaller than other steel sheets to facilitate forming a complicated shape including a drawing. The strengths can be gradually decreased from the strongest steel sheet toward the terminal steel sheets to prevent a sharp difference in strength across the joint line. Accordingly, in the embodiment shown in FIGS. 3 and 4, the intermediate steel sheets 120B, 120D, 220B, 220D that connect the central steel sheets 120A, 220A and the terminal steel sheets 120C, 120E, 220C, 220E preferably have intermediate strengths (A>B>C, A>D>E). In the four-sheet embodiment as shown in FIGS. 5 and 6, when there is another steel sheet between the strongest steel sheet and the terminal steel sheet, the strength of the intermediate steel sheet may have an intermediate strength (accordingly, A>B>C, A>D in FIG. 5, and A>B, A>C>D in FIG. 6).

In embodiments, the joint lines of the blank includes at least one joint line (e.g., the first joint lines 110a and 110c in FIG. 3) inclined with respect to the direction perpendicular to the longitudinal direction 102. This results in a gradual change of the substantial strength of the blank along the longitudinal direction between the steel sheets just above and below the first joint line, making the pillar less likely to break at the joint line when it is subjected to a lateral force.

The number of first joint lines may be at least one, or preferably one or two. For example, as shown in FIGS. 5, 6 and 9, there may be one first joint line 310a, 410b, 710a. In this case, the first joint line is preferably arranged so as to avoid just the middle of the length L, and the steel sheets 320A, 420A and 720A that include the middle of the length L have the largest strength. The strengths of the steel sheets may preferably stepwise smaller from the strongest steel sheet toward the terminal steel sheets. Alternatively, in another embodiment, although not shown, three or more first joint lines may be included. In this case, in the same manner as in the case of two joint lines described above, the strength of the steel sheet that includes the middle of the length L may preferably be the largest, with the other steel sheets having stepwise smaller strength from the strongest steel sheet toward the terminal ones. However, for some purposes, any steel sheet other than the one in the middle of the length L may have the largest strength.

The inclination of each first joint line may be either upward to the right or upward to the left. For example, the first joint lines 110a and 110c of the blank 100 in FIG. 3 are both upward to the right. Moreover, although the upper first joint line 210c of the blank 200 of FIG. 4 is upward to the right, the lower first joint line 210a is upward to the left. The first joint line preferably oriented at an angle θ ranging from 30 degrees to 60 degrees, and more preferably at an angle θ of about 45 degrees with respect to straight lines 131 and 132 perpendicular to the longitudinal direction 102 (FIG. 3).

In embodiments with two or more first joint lines, the first joint lines 110a, 110c, 510a, 510c, 610a, 610b may preferably be parallel, as shown in FIGS. 3, 7 and 8. This enables to simultaneously weld two joint lines by passing steel sheets under two fixed welding electrodes or laser sources (not shown). However, as shown in FIG. 4, the two first joint lines 210a, 210c may be arranged in a "V" configuration so that the pillar has different strengths on the front and rear sides with respect to the car.

In embodiments with two first joint lines, for two first joint lines, the lower end point (e.g., 112c in FIG. 3) of the upper first joint line 110c, 510c, 610b as shown in FIGS. 3, 7 and 8 is preferably be located above the upper end point (114a in FIG. 3) of the lower first joint line 110a, 510a, 610a. In other words, when the blank is divided by straight lines (e.g., 130-133 in FIG. 3) passing through end points of the first joint lines and perpendicular to the longitudinal direction 102 of the blank, the sections 116a and 116c that correspond to the first joint lines preferably do not overlap with each other. This means that the strength transitioning sections that correspond to the joint lines do not overlap. If this condition is satisfied particularly for the joint lines on both sides of the strongest steel sheet, the pillar can be less likely to break in that steel sheet. In embodiments with three or more first joint lines, any two adjacent first joint lines may preferably be such as described above.

As shown in FIGS. 3 to 7, the blank may have, apart from the first joint line described above, a joint line that is substantially perpendicular to the longitudinal direction 102 of the blank (e.g., second joint line 110*b* and 110*d* in FIG. 3) can also be included in at least one of the upper and lower ends of the blank. FIG. 2 schematically shows how the center pillar 10 in one embodiment is bent by receiving a lateral force F due to a side collision of the car. When the car is subjected to a side collision, the pillar may be broken, intruding into the interior. If the pillar breaks around the middle of the length L, the pillar is very likely to hit the occupant sitting in the seat. On the other hand, as shown in FIG. 2, if the center pillar 10 breaks at a point as closer to the upper and lower ends as possible (mainly the attachment portions 14 and 18 shown in FIG. 1), the middle (beam) portion would intrude into the vehicle interior with little bending. The pillar is thus less likely to hit the occupants and allows for securing the survival space for the occupants. As for the second joint line that is substantially perpendicular to the longitudinal direction, when the two steel sheets just above and below the second joint line have a significant difference in strength, the weaker steel sheet is likely to break near the joint line when subjected to a lateral load. This can be utilized to control bending mode of the pillar in the event of a side collision to enhance the safety performance of the vehicle. Specifically, as shown in FIG. 2, the strengths of the steel sheets 120C and 120E outside the upper and lower second joint lines 110*b* and 110*d* (i.e. those at the ends of the pillar) may be smaller than the steel sheets 120B and 120D just inside the joint lines to intentionally induce a failure mode in which the center pillar 10 is broken near the end. Since adjacent to the lower part of a pillar there is seats for occupants normally positioned, even if the center pillar 10 breaks near the lower end, the invasion of the center pillar 10 can be prevented by the seat. Also, the upper second joint line 110*d* can be positioned such that the pillar can be broken near the ceiling, avoiding the occupant's head.

As will be understood by those skilled in the art, the second joint lines need not be exactly perpendicular to the longitudinal direction of the blank. A pillar member produced from the blank may be attached to the vehicle body with the longitudinal direction slightly inclined from the vertical. In that case, the second joint line can be substantially horizontal when the pillar is attached to the vehicle. On the other hand, it can be understood that the first joint line described above must be sufficiently inclined with respect to the direction perpendicular to the longitudinal direction of the blank, and therefore also inclined with respect to the second joint line.

In another example, non-inclined second joint lines may be included only at either one end of the blank. In the blank 500 of FIG. 7, the second joint line 510*b* is included only at the lower end. In yet another example, no non-inclined second joint line may be included at either end of the blank, as shown in FIGS. 8 and 9. FIG. 8 is an example with two inclined first joint lines, and FIG. 9 with one.

In embodiments where the second joint lines are included at both ends of the blank, the joint lines may preferably be parallel, as shown in FIGS. 3-6. This enables to simultaneously weld the two joint lines by passing the steel sheets under two fixed welding electrodes or laser sources (not shown), which increases the production efficiency.

In a specific example, the blank 100 with five steel sheets combined as in the embodiment of FIG. 3 may have tensile strengths of the steel sheets 120E, 120D, 120A, 120B and 120C (top to bottom) are respectively 590 MPa, 980 MPa, 1180 MPa, 980 MPa and 440 MPa, and the thicknesses may be equal. Alternatively, in another example, while the tensile strength of the material is the same as above, the thicknesses of steel sheets 120E, 120D, 120A, 120B and 120C may be 1.6 mm, 2.0 mm, 2.3 mm, 2.0 mm and 1.8 mm, respectively. In still another embodiment, for some or all of the joint lines, the tensile strengths of the materials of the steel sheets just above and below the joint line may be the same while only their thicknesses are different. For example, the thicknesses of the sheets 120E, 120D, 120A, 120B and 120C may be 590 MPa, 1180 MPa, 1180 MPa, 1180 MPa and 440 MPa, respectively, and the thicknesses may be varied stepwise in the same manner as described above. These are merely examples, and various other patterns of thicknesses and tensile strengths are possible for the blank of FIG. 3 depending on the type of vehicle. The blanks 200, 300, 400, 500, 600 and 700 of FIGS. 4-9 may likewise have various patterns of thicknesses and tensile strengths.

The completed blanks 100, 200, 300, 400, 500, 600 and 700 may be press formed by hot pressing, warm pressing, cold pressing or other method into a desired three-dimensional shape to produce the outer member or other member of a pillar. For example, in the case of hot pressing, a blank made of quenchable steel sheets is heated to a high temperature such as 900 degrees and then pressed between dies of lower temperature, thereby formed into a desired shape and simultaneously hardened due to quenching.

Although embodiments of the present disclosure have been described above using specific structures and numerical values, those skilled in the art can make substitutions, improvements and changes without departing from the spirit of the present disclosure.

The invention claimed is:

1. A vehicle pillar member having a length, comprising:
   a plurality of steel sheets welded along at least one joint line transverse to a longitudinal direction of the vehicle pillar member;
   for each joint line, the strengths of the steel sheets just above and below the joint line being different;
   the at least one joint line including:
      one or more first joint lines inclined with respect to a direction perpendicular to the longitudinal direction of the vehicle pillar member; and
      a second joint line in at least one of upper and lower ends of the vehicle pillar member, the second joint line being oriented substantially perpendicular to the longitudinal direction,
   the one or more first joint lines being inclined with respect to the second joint line, and
   a strength of the steel sheets outside the second joint line being smaller than a strength of the steel sheet just inside the second joint line.

2. The vehicle pillar member of claim 1, wherein for each joint line, the thicknesses of the steel sheets just above and below the joint line are different.

3. The vehicle pillar member of claim 1, wherein
   the one or more first joint lines are two first joint lines, and the strengths of two steel sheets immediately outside the uppermost first joint line and the lowermost first joint line are smaller than the strength of the steel sheet or sheets between the two first joint lines.

4. The vehicle pillar member of claim 1, wherein
   one of the plurality of steel sheets that has a highest strength is positioned so as to include a center of the length of the vehicle pillar member.

5. The vehicle pillar member of claim 1, wherein
   for at least one pair of two adjacent first joint lines, the lower end point of the upper first joint line is located above the upper end point of the lower first joint line.

6. The vehicle pillar member of claim 1, wherein at least two first joint lines are parallel.

7. The vehicle pillar member of claim 1, wherein the one or more first joint lines are inclined at an angle in a range of 30 to 60 degrees with respect to the direction perpendicular to the longitudinal direction.

8. The vehicle pillar member of claim 1, wherein one of the plurality of steel sheets that contains a center of a length of the pillar member is joined by one of the one or more first joint lines with an adjacent steel sheet.

\* \* \* \* \*